(12) United States Patent
Ishino et al.

(10) Patent No.: US 11,245,811 B2
(45) Date of Patent: Feb. 8, 2022

(54) IMAGE PROCESSING APPARATUS, METHOD AND NON-TRANSITORY COMPUTER READABLE MEDIUM STORING IMAGE PROCESSING PROGRAM

(71) Applicant: FUJIFILM Business Innovation Corp., Tokyo (JP)

(72) Inventors: Shigeki Ishino, Kanagawa (JP); Minoru Sodeura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 291 days.

(21) Appl. No.: 16/161,068

(22) Filed: Oct. 16, 2018

(65) Prior Publication Data
US 2019/0124229 A1 Apr. 25, 2019

(30) Foreign Application Priority Data
Oct. 24, 2017 (JP) .............................. JP2017-204993

(51) Int. Cl.
| | | |
|---|---|---|
| *H04N 1/393* | (2006.01) | |
| *G06T 7/13* | (2017.01) | |
| *G06T 7/60* | (2017.01) | |
| *H04N 1/203* | (2006.01) | |
| *G06T 7/194* | (2017.01) | |
| *G06T 7/11* | (2017.01) | |

(Continued)

(52) U.S. Cl.
CPC .............. *H04N 1/393* (2013.01); *G06T 7/11* (2017.01); *G06T 7/13* (2017.01); *G06T 7/194* (2017.01); *G06T 7/60* (2013.01); *G06T 11/001* (2013.01); *G06T 11/60* (2013.01); *H04N 1/2038* (2013.01); *H04N 1/3873* (2013.01); *G06T 2207/10008* (2013.01); *G06T 2207/30176* (2013.01)

(58) Field of Classification Search
CPC .... H04N 1/393; H04N 1/2038; H04N 1/3873; G06T 7/194; G06T 7/11; G06T 7/13; G06T 7/60; G06T 11/60; G06T 11/001; G06T 2207/10008; G06T 2207/30176
See application file for complete search history.

(56) References Cited

U.S. PATENT DOCUMENTS

| | | | | |
|---|---|---|---|---|
| 7,551,314 B2 * | 6/2009 | Cheung | .............. | H04N 1/00018 358/1.2 |
| 8,098,411 B2 * | 1/2012 | Iwago | .................. | H04N 1/0057 358/498 |

(Continued)

FOREIGN PATENT DOCUMENTS

| | | |
|---|---|---|
| JP | H1141450 | 2/1999 |
| JP | 2003046731 | 2/2003 |

(Continued)

OTHER PUBLICATIONS

Office Action of Japan Counterpart Application, with English translation thereof, dated Jun. 1, 2021, pp. 1-6.

(Continued)

*Primary Examiner* — Gregory M Desire
(74) *Attorney, Agent, or Firm* — JCIPRNET

(57) ABSTRACT

An image processing apparatus includes a painting section and an extraction section. The painting section performs painting on a margin at an end part of an image. The extraction section extracts a document included in the image on which the painting is performed by the painting section.

7 Claims, 10 Drawing Sheets

(51) Int. Cl.
*G06T 11/00* (2006.01)
*G06T 11/60* (2006.01)
*H04N 1/387* (2006.01)

(56) References Cited

U.S. PATENT DOCUMENTS

| | | | | |
|---|---|---|---|---|
| 8,149,478 | B2* | 4/2012 | Onishi | H04N 1/0035 |
| | | | | 358/488 |
| 8,493,588 | B2* | 7/2013 | Tan | H04N 1/4406 |
| | | | | 358/1.14 |
| 8,516,390 | B2* | 8/2013 | Clarke | G06F 3/14 |
| | | | | 715/788 |
| 8,688,579 | B1* | 4/2014 | Ethington | G06K 9/4609 |
| | | | | 705/42 |
| 9,876,925 | B2* | 1/2018 | Mizude | H04N 1/00748 |
| 10,674,035 | B2* | 6/2020 | Mizude | H04N 1/3873 |
| 10,810,777 | B1* | 10/2020 | Day-Richter | G06T 1/20 |
| 2019/0124229 | A1* | 4/2019 | Ishino | G06T 11/60 |

FOREIGN PATENT DOCUMENTS

| | | |
|---|---|---|
| JP | 2009272678 | 11/2009 |
| JP | 2009272723 | 11/2009 |

OTHER PUBLICATIONS

"Office Action of Japan Counterpart Application", dated Nov. 24, 2021, with English translation thereof, p. 1-p. 5.

* cited by examiner

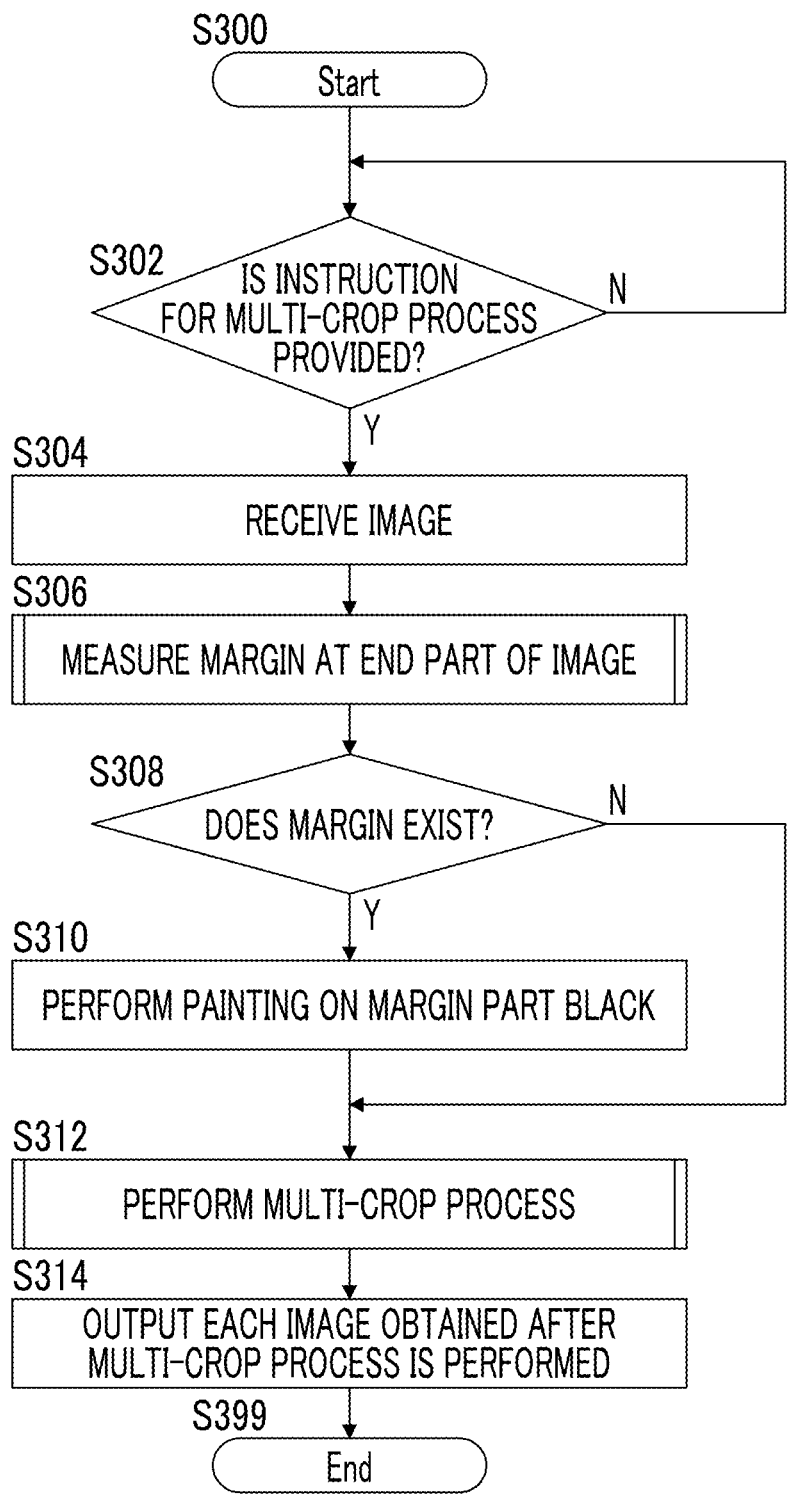

FIG. 5A
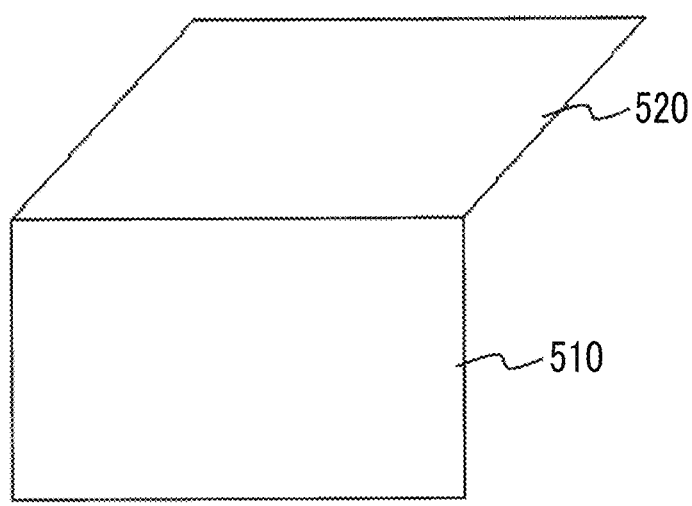
FIG. 5B1
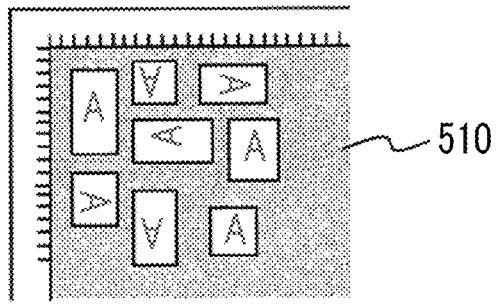
FIG. 5B2
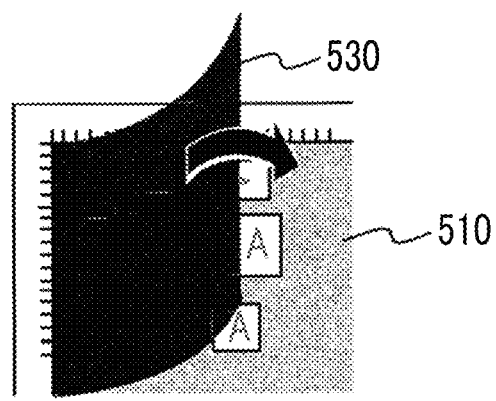

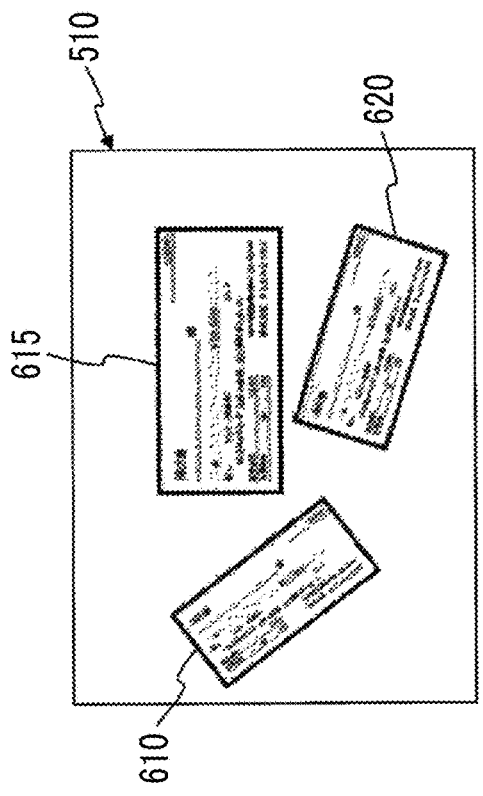
FIG. 6A2
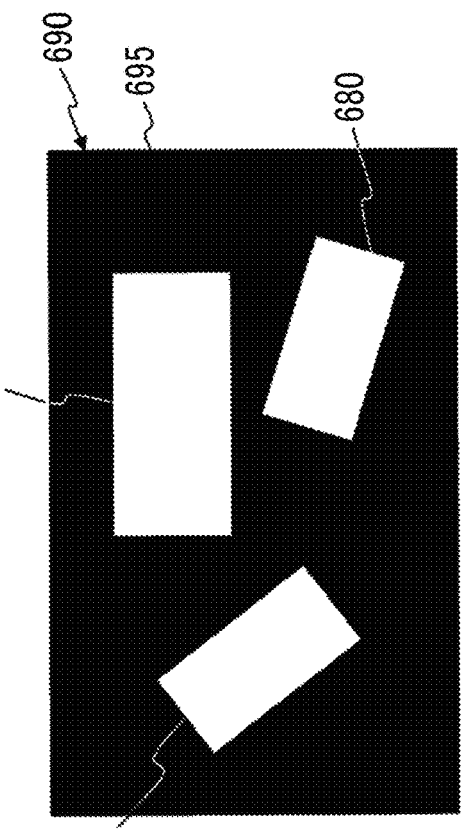
FIG. 6B2
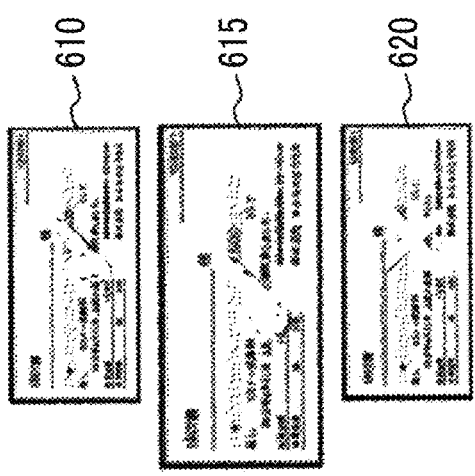
FIG. 6A1
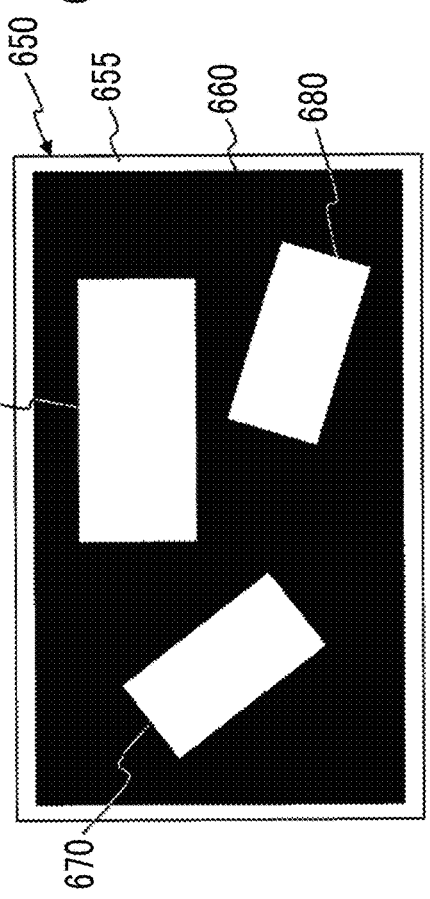
FIG. 6B1

| END PART ID | MARGIN FLAG | MARGIN WIDTH |
|---|---|---|
| END PART 1 | | |
| END PART 2 | | |
| END PART 3 | | |
| END PART 4 | | |

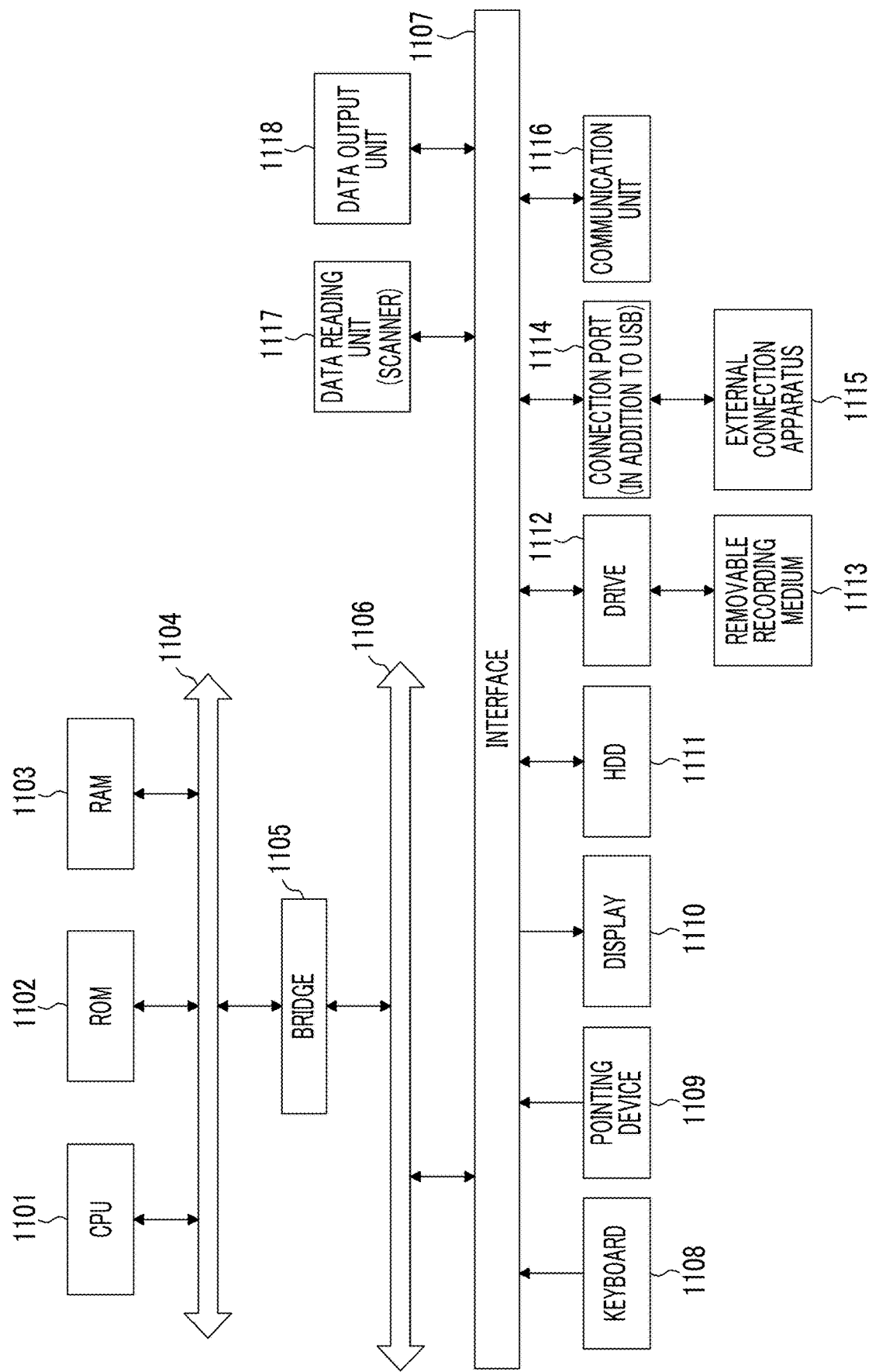

IMAGE PROCESSING APPARATUS, METHOD AND NON-TRANSITORY COMPUTER READABLE MEDIUM STORING IMAGE PROCESSING PROGRAM

CROSS-REFERENCE TO RELATED APPLICATIONS

This application is based on and claims priority under 35 USC 119 from Japanese Patent Application No. 2017-204993 filed Oct. 24, 2017.

BACKGROUND

Technical Field

The present invention relates to an image processing apparatus and a non-transitory computer readable medium storing an image processing program.

SUMMARY

According to an aspect of the invention, there is provided an image processing apparatus including: a painting section that performs painting on a margin at an end part of an image; and an extraction section that extracts a document included in the image on which the painting is performed by the painting section.

BRIEF DESCRIPTION OF THE DRAWINGS

Exemplary embodiment(s) of the present invention will be described in detail based on the following figures, wherein:

FIG. 3 is a flowchart illustrating a processing example according to the exemplary embodiment;

FIGS. 5A, 5B1 and 5B2 are explanatory diagrams illustrating the processing examples according to the exemplary embodiment;

FIGS. 6A1, 6A2, 6B1, and 6B2 are explanatory diagrams illustrating the processing examples according to the exemplary embodiment;

FIG. 11 is a block diagram illustrating an example of a hardware configuration of a computer which realizes the exemplary embodiment.

DETAILED DESCRIPTION

Hereinafter, an exemplary embodiment of the present invention will be described in detail with reference to the accompanying drawings.

Figure 1:
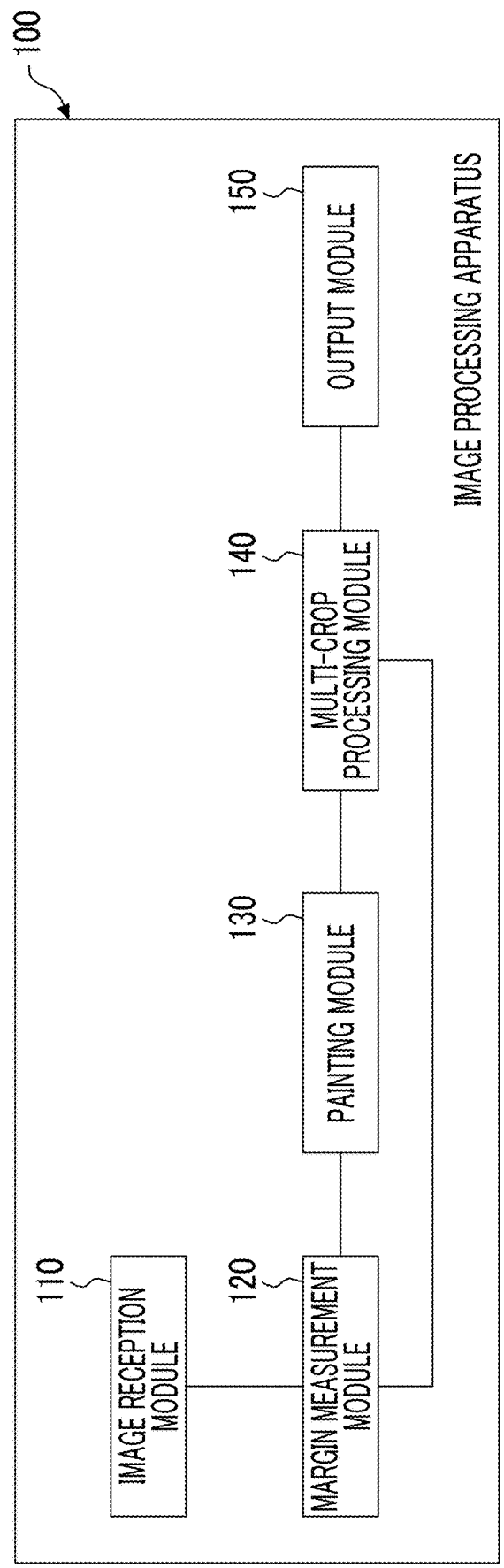
FIG. 1 is a conceptual module configuration diagram illustrating a configuration example of an exemplary embodiment.

FIG. 1 is a conceptual module configuration diagram illustrating a configuration example of the exemplary embodiment.

Meanwhile, a module generally indicates a component, such as software (a computer program) or hardware, which can be logically separated. Therefore, the module in the exemplary embodiment indicates not only the module in the computer program but also a module in a hardware configuration. Therefore, in the exemplary embodiment, descriptions of a computer program (a program used to cause a computer to perform each procedure, a program used to cause the computer to function as each section, or a program used to cause the computer to realize each function), which is used to function as the module, a system, and a method, are also performed. However, although, for convenience of explanation, "store", "cause to store", and terms equivalent thereto are used, the terms mean "cause to be stored in a storage apparatus" or "performs control to cause to be stored in the storage apparatus" in a case where the exemplary embodiment corresponds to the computer program. In addition, although the module may correspond to a function one to one, one module may include one program or plural modules may include one program in a case where the module is mounted. In contrast, one module may include plural programs. In addition, the plural modules may be executed by one computer, or one module may be executed by plural computers using computers in a distributed or parallel environment. Meanwhile, one module may include another module. In addition, hereinafter, "connection" is used in a case of logical connection (an exchange of data, an instruction, a reference relationship between data, a login, or the like) in addition to physical connection. "Predetermined" indicates "determined before a target process is performed", and is used while including the meaning of "determined according to a situation or a state at that time or according to a situation or a state until that time if the target process is not performed yet before a process according to the exemplary embodiment starts and even after the process according to the exemplary embodiment starts". In a case where plural "predetermined values" exist, the values may be different from each other and two or more values (apparently, all values are included) may be the same. In addition, a description in which "in a case of A, B is performed" is used in a meaning that "it is determined whether or not A, and B is performed in a case where it is determined to be A". However, a case where it is not necessary to determine whether or not A is excluded. In addition, a case where things are enumerated like "A, B, and C" is exemplified enumeration insofar as there is no particular remark, and includes a case where only one of them is selected (for example, only A).

In addition, a case where a system or an apparatus is formed in such a way that plural computers, hardware, apparatuses, and the like are connected via a communication section, such as a network (including one-to-one correspondence communication connection), and a case where the system or the apparatus is realized by one computer, hardware, an apparatus, or the like are included. The "apparatus" and the "system" are used as mutually synonymous terms. Apparently, the "system" does not include a social "mechanism" (social system) which is just an artificial arrangement.

In addition, target information is read from a storage apparatus for each process performed by each module or for each process in a case where plural processes are performed in the module, and a processing result is written in the storage apparatus after the process is performed. Therefore, there is a case where reading from the storage apparatus before the process is performed and writing in the storage apparatus after the process is performed are not described. Meanwhile, here, the storage apparatus may include a hard disk, a Random Access Memory (RAM), an external storage medium, a storage apparatus via a communication line, a register in a Central Processing Unit (CPU), and the like.

An image processing apparatus 100 according to the exemplary embodiment performs a process for extracting a document included in an image, and includes an image reception module 110, a margin measurement module 120, a painting module 130, a multi-crop processing module 140, and an output module 150, as illustrated in an example of FIG. 1.

Here, the "process for extracting the document" is generally referred to as a crop process or the like. The document is extracted from one image, and an image of the document is cut down. In addition, a "process for extracting plural documents" at one time is referred to as a multi-crop process, a multi-scan process, or the like. Specifically, the plural documents are scanned at one time (that is, the plural documents are included in one image), and image files corresponding to the documents are cut and generated. It is not necessary to open and close a document stand cover several times, and thus it is possible to improve efficiency of an operation. A document which is a target may have a small size (for example, a size which is smaller than an A4 size or the like) or a non-fixed size (a size other than A4/A5/A6/B4/B5/B6 sizes corresponding to fixed sizes, a postcard size, or the like). Specifically, there is a small document such as a receipt, a picture, a name card, or a card.

"Extract the document" means "cut the image of the document in the image".

In the exemplary embodiment, for example, a process as below is performed. In particular, a description in this paragraph is provided for easy understanding of the exemplary embodiment, and is not intended to limitedly interpret the description. Furthermore, it is apparent that determination, in which the invention for which a patent is sought is described in detailed description of the invention (Article 36(6) (i) of Patent Act), is not performed using only the description.

In the multi-crop process, a scan is performed in a state in which black paper is covered on a back surface.

Generally, paper, which is printed using a printer, is used as the black paper covered on the back surface.

However, in a case where the black paper is printed using the printer, there is a high possibility that a whole surface is not printed black and a frame part remains due to performance limitations of the printer.

Furthermore, in the multi-crop process, in a case where a white area exists in a rectangular shape at an end part, the frame part is cut, and thus an area which should be originally cut is not cut. In addition, furthermore, there is a characteristic in which, in a case where the document is not disposed several millimeters inside of the end part, the document is not recognized.

Therefore, in the multi-crop process, in a case where a margin exists at the end part of the image and even in a case where the margin does not exist, it is not possible to correctly cut the document disposed in a location which is close to the end part.

In order to avoid this, there is a method for performing the multi-crop process after cutting the end part in advance before a cutting process is performed. However, in a case where only the margin is cut, it is not possible to perform the multi-crop process on the document disposed near to an end part of the document stand (also referred to as document glass).

Here, in the image processing apparatus 100, the margin at the end part of the image is measured, and the multi-crop process is performed after performing painting black on the relevant part in a case where the margin is measured.

The measurement of the margin is determined for every line in the main scan direction and the sub scan direction.

In the determination, L (luminance) or a predetermined threshold value (threshold) is used in RGB-system color space.

In a case where the margin at the end part is changed to black before the multi-crop process and the multi-crop process is performed after blackening, it is also possible to normally perform the multi-crop process even on the document disposed in a location which is close to an end part of the margin.

The image reception module 110 is connected to the margin measurement module 120. The image reception module 110 receives the image and delivers the image to the margin measurement module 120. A case where the image is received includes, for example, a case where the image is read using a scanner, a camera or the like, a case where the image is received from an external device using a facsimile or the like via the communication line, a case where the image stored in a hard disk (including a hard disk which is connected via a network in addition to a hard disk embedded in a computer) or the like is read, and the like. The image may be a binary image or a multi-level image (including a color image). One or plural images may be received.

In addition, the image received by the image reception module 110 is obtained by photographing a document which has a size smaller than the image. Furthermore, the image may include plural documents (plural documents may be photographed and included in one image).

In addition, a background of the image received by the image reception module 110 is black, and the background may be obtained by photographing paper which is printed by an image forming apparatus (an image reading and forming apparatus 200 or an image reading and forming apparatus 210 which will be described later).

Here, specifically, "the paper which is printed by the image forming apparatus" may include paper copied while the document stand cover is opened and nothing is loaded on a document stand of a copying machine or paper obtained by printing a document, which has one surface that is black, using a printer. With either paper, in a case where the copying machine and the printer do not have a borderless printing function, the margin is generated at the end part (edge part). In addition, even in a case where the copying machine and the printer have the borderless printing function, there is a possibility that the margin is generated at the end part.

The margin measurement module 120 is connected to the image reception module 110, the painting module 130, and the multi-crop processing module 140. The margin measurement module 120 measures the margin at the end part of the image received by the image reception module 110.

In addition, the margin measurement module 120 measures a width of the margin for each main scan or sub scan of the image (hereinafter, referred to as a line). For example, the width of the margin is measured by sequentially performing a measurement process from an outer side line to an inner side line of the image.

The painting module 130 is connected to the margin measurement module 120 and the multi-crop processing module 140. The painting module 130 performs painting on the margin at the end part of the image received by the image reception module 110. Here, the "end part" indicates an edge part which exists at the top, the bottom, the right, or the left of a rectangular image.

In addition, the painting module 130 may paint the margin of the image whose margin is measured by the margin measurement module 120.

In addition, the painting module 130 may paint the width of the margin measured by the margin measurement module 120.

A color, which is obtained by performing the painting by the painting module 130, may be black. Meanwhile, although a color, which is obtained by performing the painting on the margin, is generally black, the color, which is obtained by performing the painting on the margin, may be a color of the background (that is, a color copied from a background part).

The multi-crop processing module 140 is connected to the margin measurement module 120, the painting module 130, and the output module 150. The multi-crop processing module 140 extracts a document included in the image on which the painting is performed by the painting module 130.

In addition, the multi-crop processing module 140 may generate an image file for each document. In a case where plural documents exist in the image, plural image files are generated.

The output module 150 is connected to the multi-crop processing module 140. The output module 150 receives the image (image file) extracted by the multi-crop processing module 140, and outputs the image. A case where the image is output includes, for example, a case where the image is printed using a printing apparatus such as a printer, a case where the image is displayed on a display apparatus such as a display, a case where the image is transmitted using an image transmission apparatus such as a facsimile, a case where the image is written in an image storage apparatus such as an image database, a case where the image is stored in a storage medium such as a memory card, and a case where the image is delivered to another information processing apparatus (for example, a service providing apparatus 250 which will be described later).

Figure 2A:
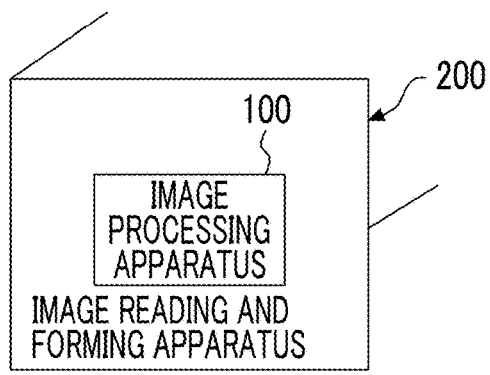
FIGS. 2A and 2B are explanatory diagrams illustrating a configuration example of a system using the exemplary embodiment.
Figure 2B:
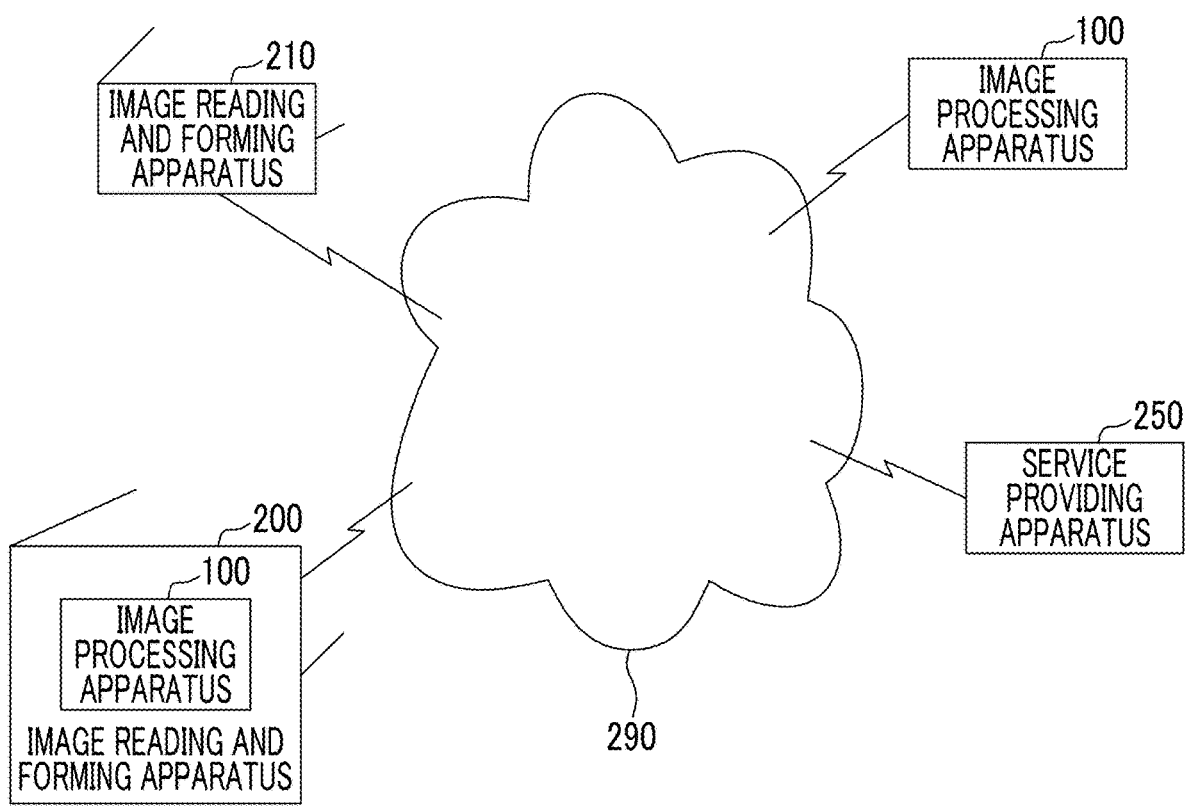

FIGS. 2A and 2B are explanatory diagrams illustrating a configuration example of a system using the exemplary embodiment.

FIG. 2A illustrates a configuration example of a stand-alone system.

The image reading and forming apparatus 200 includes the image processing apparatus 100. The image reading and forming apparatus 200 includes a copying machine, a facsimile, a scanner, a printer, a multifunction printer (an image processing apparatus which has two or more functions of the scanner, the printer, the copying machine, the facsimile, and the like).

For example, the plural documents, such as receipts, are placed on the document stand of the image reading and forming apparatus 200, and the plural image files are generated by one scan. Furthermore, the image files may be stored in a storage medium, such as a memory card, using a card reader/writer mounted on the image reading and forming apparatus 200, the images of the plural extracted documents may be printed on respective pieces of paper.

FIG. 2B illustrates a configuration example of a system which includes plural apparatuses via a communication line 290.

The image reading and forming apparatus 200 includes the image processing apparatus 100. In addition, the image reading and forming apparatus 210 does not include the image processing apparatus 100.

The image processing apparatus 100, the image reading and forming apparatus 200, the image reading and forming apparatus 210, and the service providing apparatus 250 are respectively connected via the communication line 290. In addition, functions performed by the image processing apparatus 100 and the service providing apparatus 250 may be realized as a cloud service. The communication line 290 may be wireless, wired, and a combination thereof, and may include, for example, the Internet, an intranet, or the like as a communication infrastructure.

For example, the documents, such as plural receipts, are placed on the document stand of the image reading and forming apparatus 210, and the documents are read by one scan. The read images are transmitted to the image processing apparatus 100 (or the image processing apparatus 100 of the image reading and forming apparatus 200) via the communication line 290, and plural image files are generated for respective documents in the image processing apparatus 100. Furthermore, the image files are transmitted to the service providing apparatus 250. The service providing apparatus 250 receives, processes, and stores the image files. For example, the service providing apparatus 250 may just store the image files, may perform a character recognition process on each of the image files, may perform a name card service, such as preparation of a name list, in a case where the documents are name cards, and may perform an accounting process service, such as expense settlement, in a case where the documents are receipts.

FIG. 3 is a flowchart illustrating the processing example according to the exemplary embodiment.

In step S302, the image reception module 110 determines whether or not an instruction for the multi-crop process is provided. In a case where the instruction for the multi-crop process is provided, the process proceeds to step S304. Otherwise, the image reception module 110 stands by until the instruction is provided.

Figure 4A:
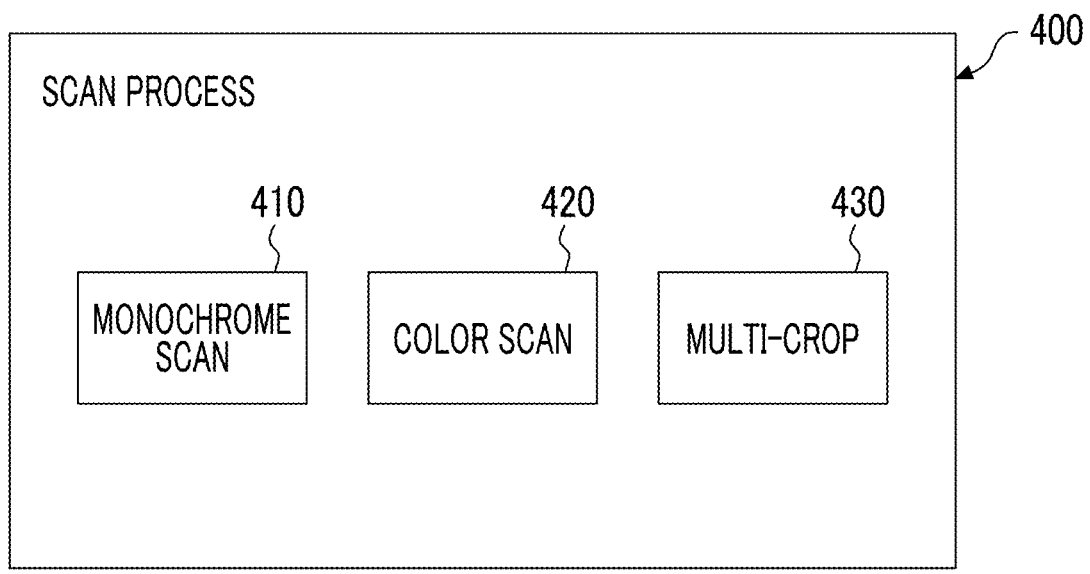
FIGS. 4A and 4B are explanatory diagrams illustrating processing examples according to the exemplary embodiment.
Figure 4B:
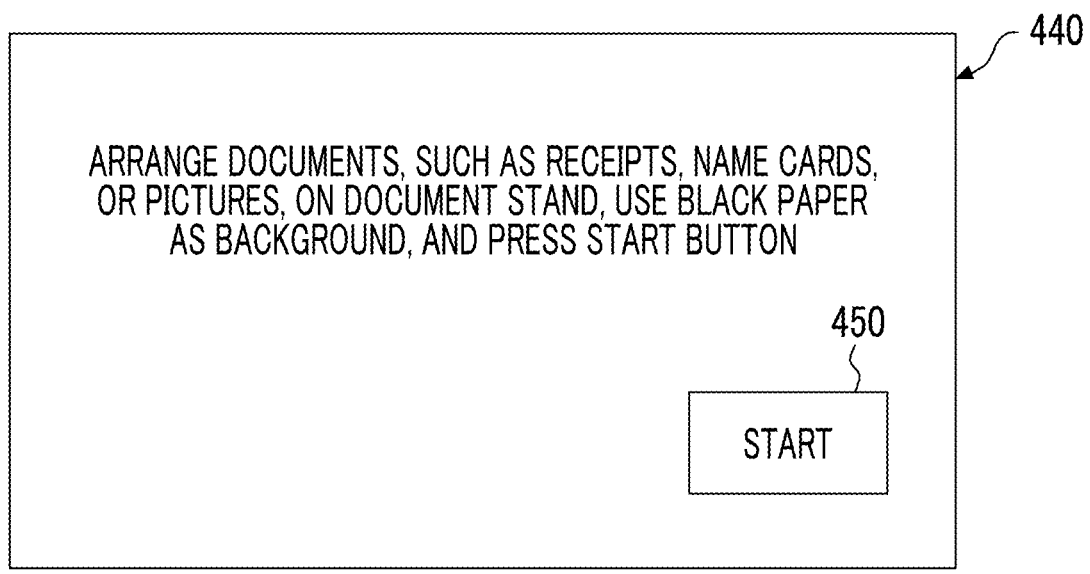

FIGS. 4A and 4B are explanatory diagrams illustrating the processing example according to the exemplary embodiment.

A monochrome scan 410, a color scan 420, and a multi-crop 430 are displayed on a screen 400 of the image reading and forming apparatus 200 (or the image reading and forming apparatus 210). For example, the screen 400 is a touch panel.

In a case where the multi-crop 430 is selected through an operation of a user, a message area 440 is displayed on the screen 400. A usage method for performing the multi-crop process and a start button 450 is displayed in the message area 440. For example, "Please arrange documents, such as receipts, name cards, or pictures, on the document stand, use black paper as a background, and press the start button (start button 450) using the black paper as a background" is displayed. As the "black paper", for example, black paper prepared in advance may be used, copying may be performed while nothing is placed on the document stand 510 of the image reading and forming apparatus 200 and the document stand cover 520 is open as described above, or a document which has one surface that is black may be printed by the image reading and forming apparatus 200.

In step S304, the image reception module 110 receives the image.

FIGS. 5A, 5B1, 5B2, 6A1, 6A2, 6B1, and 6B2 are explanatory diagrams illustrating the processing example according to the exemplary embodiment. As illustrated in FIGS. 5A, 5B1, and 5B2, the plural documents (in the example of FIG. 6A1, a document 610, a document 615, and a document 620 which are receipts) are placed on the document stand 510 of the image reading and forming apparatus 200. Directions of the documents may be a vertical direction, a horizontal direction, an upside down direction, a diagonal direction, and the like. The image files are generated by extracting document images (scan data) one by one from the image which includes the plural documents. Meanwhile, the directions may be corrected in a correct direction (such that characters in the documents can be read as usually). For example, as illustrated in FIG. 6A2, the document 610, the document 615, and the document 620 are disposed on the document stand 510. The documents may be disposed such that the documents are not superimposed (not be in contact with each other) with each other and have allowance around the documents. For example, the documents may be separated at a predetermined distance (for example, 10 mm or the like) or more. Furthermore, in order to make allowance around the documents in addition to between the documents, the documents are caused to not be in contact with each other around the document stand 510. For example, the documents may be disposed on inner sides from top, bottom, right, and left ends of the document stand 510 by a predetermined distance (for example, 2 mm or the like) or more.

Furthermore, as illustrated in the example of FIG. 5B2, black paper 530 is placed from above the documents. That is, the black paper 530 becomes the background of the documents. It is apparent that the black paper 530 is placed such that a black surface of the black paper 530 faces a side of the document stand 510 (such that the black surface is read). In addition, the documents may be disposed on inner sides from top, bottom, right, and left ends of the black paper 530 by the predetermined distance (for example, 2 mm or the like) or more. Furthermore, the document stand cover 520 is closed, the start button 450 is selected by the user, and the images are read (scanned). In a case of the example of FIG. 6A2, it is possible to read three documents at once.

For example, an image 650 illustrated in FIG. 6B1 is generated by reading the images. The image 650 includes a white edge 655 and a black background 660. A document image 670, a document image 675, and a document image 680 exist on the black background 660. Meanwhile, the white edge 655 may be generated in a case where the paper, which is copied while nothing is placed on the document stand 510 of the image reading and forming apparatus 200 and the document stand cover 520 is open, or the paper, which is obtained by printing the document having one surface that is black by the image reading and forming apparatus 200, is used as the black paper 530, as described above. The reason for this is that printing, in which an edge exists, is generally performed. Meanwhile, even in a case of the black paper (the black paper 530 which has an end part that is black) which is prepared in advance, the white edge 655 may be generated according to a performance of the scanner of the image reading and forming apparatus 200.

In step S306, the margin measurement module 120 measures the margin at the end part of the image. A detailed process in step S306 will be described later using a flowchart illustrated in an example of FIG. 8.

Figure 7:
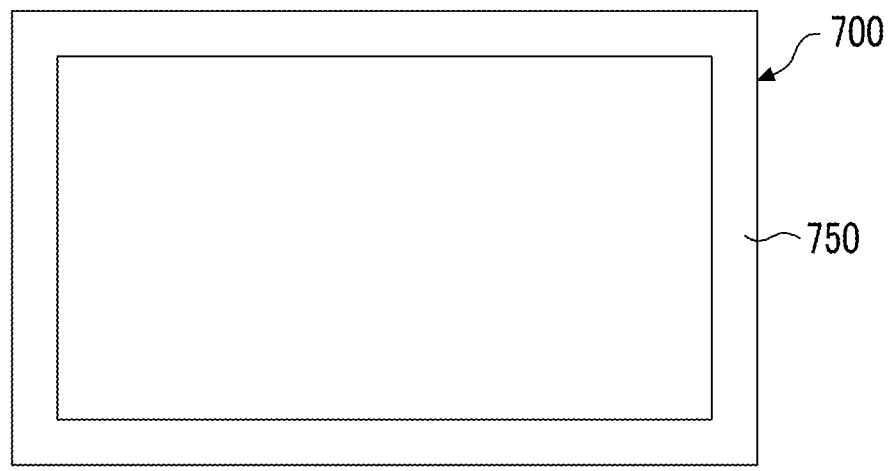
FIG. 7 is an explanatory diagram illustrating the processing example according to the exemplary embodiment.

Meanwhile, as illustrated in an example of FIG. 7, the end part of the image corresponds to an end part 750 of a periphery (a circumference, an outer circumference, an outer edge, or a rim) in the image 700. That is, the end part includes four edge parts of the image 700. It is detected whether or not a margin exists in the end part 750.

In step S308, the margin measurement module 120 determines whether or not the margin exists. In a case where the margin exists, the process proceeds to step S310. Otherwise, the process proceeds to step S312.

In step S310, the painting module 130 performs painting on a margin part black. In a case where the painting is performed on the white edge 655 of the image 650 of FIG. 6B1, an image 690 illustrated in the example of FIG. 6B2 is obtained. That is, in the image 690, the white edge 655 does not exist, and the document image 670, the document image 675, and the document image 680 exist on the black background 695.

In step S312, the multi-crop processing module 140 performs the multi-crop process. An existing technology may be used as the multi-crop process. The processes performed by the margin measurement module 120 and the painting module 130 are preprocesses with respect to the multi-crop processing module 140, and thus the multi-crop processing module 140 may perform the existing process. For example, a detailed process in step S312 will be described using a flowchart illustrated in an example of FIG. 10.

Meanwhile, here, a process target is the image 690 illustrated in the example of FIG. 6B2. In the example of FIG. 6B2, three image files, that is, the document image 670, the document image 675, the document image 680 are generated.

In step S314, the output module 150 outputs the respective images after the multi-crop process is performed. Furthermore, thereafter, an accounting process is performed on, for example, the three image files, that is, the document image 670, the document image 675, and the document image 680.

Figure 8:
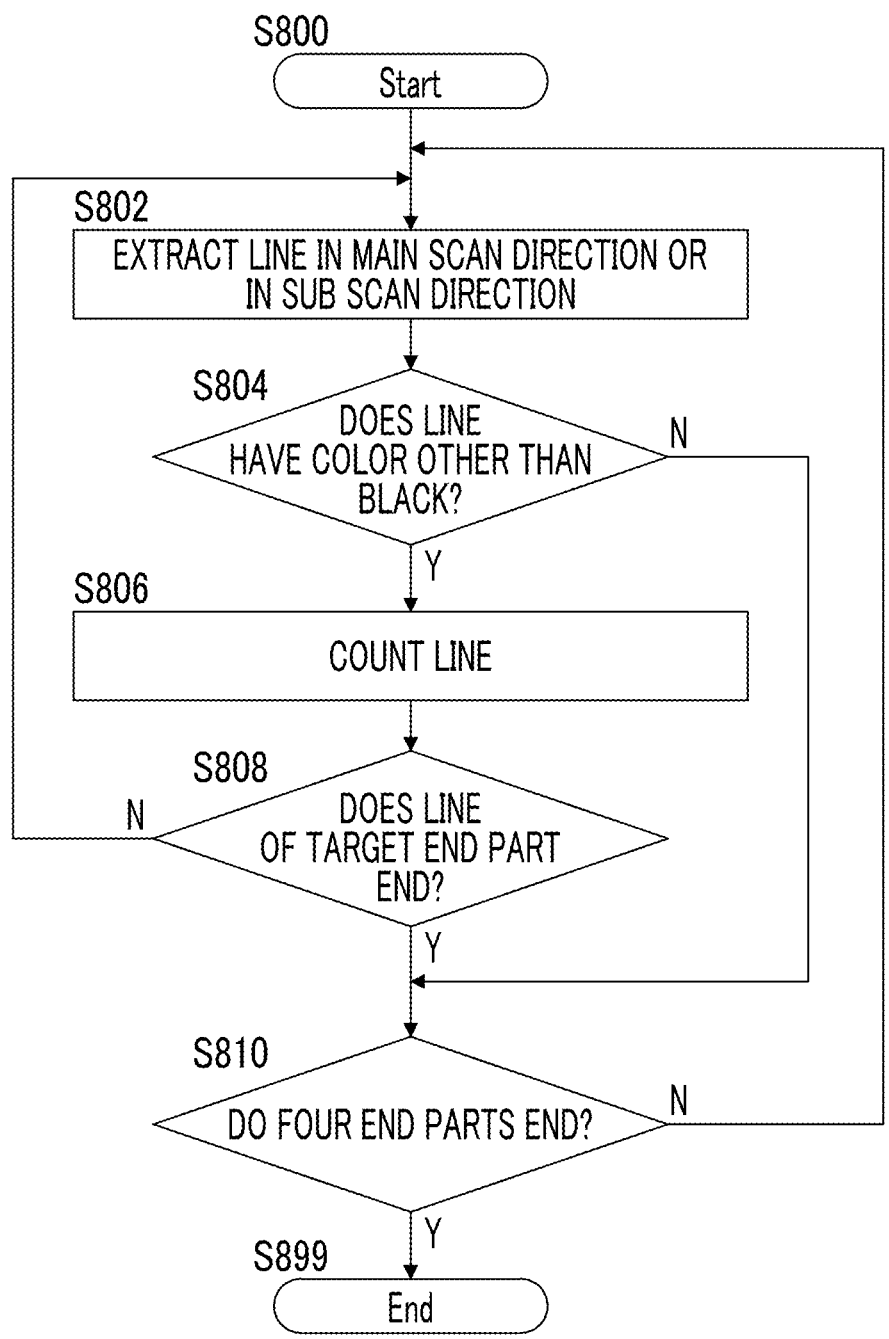
FIG. 8 is a flowchart illustrating the processing example according to the exemplary embodiment.

FIG. 8 is a flowchart illustrating the processing example (step S306 in the flowchart illustrated in the example of FIG. 3) according to the exemplary embodiment.

In step S802, a line in the main scan direction or in the sub scan direction is extracted. For example, a line in the end part 750 illustrated in FIG. 7 is extracted. The line is extracted from the outer side.

In step S804, it is determined whether or not the line has a color other than black (for example, the margin). In a case where the line is the color other than black, the process proceeds to step S806. In a case where the line is black, the process proceeds to step S810. In a case where the process proceeds to step S810, the process is performed at another end part. Meanwhile, it may be determined whether or not entire pixels in the line are colors of black. A fact, which is obtained by determining whether or not pixels other than black pixels more than a predetermined threshold value, may be provided as a determination reference. A fact, which is obtained by determining whether or not pixels other than the black pixels exist more than a predetermined ratio (a ratio of the number of entire pixels included in the line), may be provided as the determination reference.

In step S806, the line is counted. That is, the width of the margin is measured.

In step S808, it is determined whether or not a line of a target end part ends. In a case where the line of the target end part ends, the process proceeds to step S810. Otherwise, the process returns to step S802.

In step S810, it is determined whether or not four end parts end. In a case where the four end parts end, the process ends (step S899). Otherwise, the process returns to step S802.

For example, a margin measurement table 900 is generated through the process illustrated in the example of FIG.

Figures 9, 10:
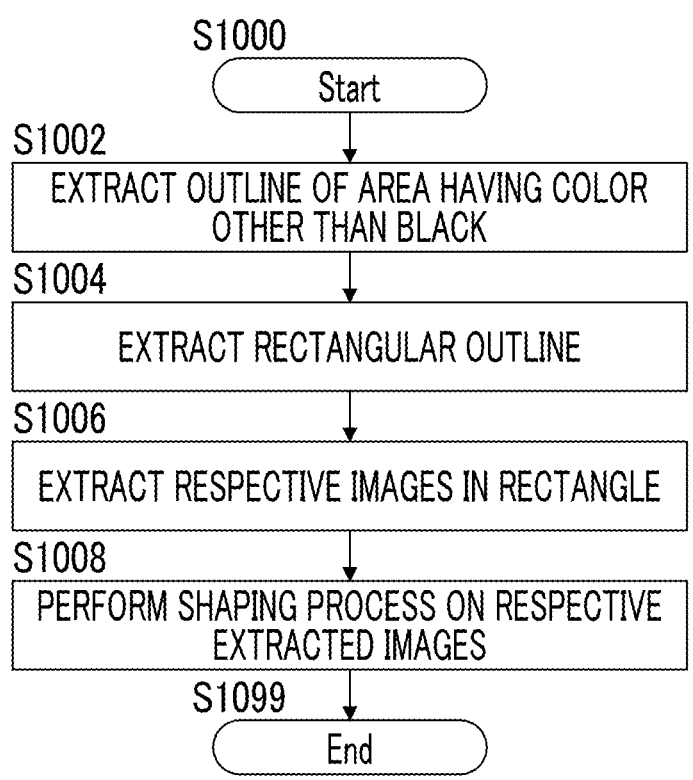
FIG. 9 is an explanatory diagram illustrating an example of a data structure of a margin measurement table.
FIG. 10 is a flowchart illustrating the processing example according to the exemplary embodiment.

8. FIG. 9 is an explanatory diagram illustrating an example of a data structure of the margin measurement table 900.

The margin measurement table 900 includes an end part ID field 910, a margin flag field 920, and a margin width field 930. The end part ID field 910 stores information (end part Identification (ID)) used to uniquely identify the end part in the exemplary embodiment. Four end parts, that is, top, bottom, right, and left end parts exist. The margin flag field 920 stores information (margin flag) which indicates whether or not the end part is the margin. In a case where the margin does not exist, a painting process is not performed. The margin width field 930 stores the width of the margin. The width of the margin is a final value which is counted in step S806. Therefore, it is not necessary to paint the entirety of the end part 750, and thus it is possible to paint only a necessary area.

FIG. 10 is a flowchart illustrating the processing example (step S312 in the flowchart illustrated in the example of FIG. 3) according to the exemplary embodiment.

In step S1002, an outline of an area having a color other than black is extracted. In the example of FIG. 6B2, the outline of the area other than black is extracted in addition to the document image 670, the document image 675, and the document image 680. For example, an outline in the document image 670 or the like is an extraction target.

In step S1004, a rectangular outline is extracted. Here, an outline other than a rectangle is excluded, and thus the document image 670, the document image 675, and the document image 680 are extracted. Meanwhile, conditions in which a size of the rectangle is larger than a predetermined size and the size of the rectangle is equal to or larger than the predetermined size may be added.

In step S1006, images in the rectangle are extracted.

In step S1008, a shaping process is performed on the respective extracted images. The shaping process includes rotation correction, inclination correction, scaling, or the like. For example, affine transformation or the like may be performed.

An example of a hardware configuration of the image processing apparatus according to the exemplary embodiment will be described with reference to FIG. 11. The configuration illustrated in FIG. 11 includes, for example, a personal computer (PC) or the like, and illustrates the example of the hardware configuration which includes a data reading unit 1117, such as a scanner, and a data output unit 1118 such as a printer.

A Central Processing Unit (CPU) 1101 is a control unit which performs a process according to a computer program that describes execution sequences of various modules described in the above-described exemplary embodiment, that is, respective modules, such as the image reception module 110, the margin measurement module 120, the painting module 130, the multi-crop processing module 140, and the output module 150.

A Read Only Memory (ROM) 1102 stores a program, an arithmetic parameter, and the like which are used by the CPU 1101. A Random Access Memory (RAM) 1103 stores a program which is used in execution of the CPU 1101, a parameter which appropriately changes in the execution, and the like. The memories are connected to each other via a host bus 1104 which includes a CPU bus or the like.

The host bus 1104 is connected to an external bus 1106, such as a Peripheral Component Interconnect/Interface (PCI) bus, via a bridge 1105.

A keyboard 1108 and a pointing device 1109, such as a mouse, are devices which are operated by an operator. The display 1110 includes a liquid crystal display device, a Cathode Ray Tube (CRT), or the like, and displays various pieces of information as text or image information. In addition, the display 1110 may be a touch screen or the like which includes both functions of the pointing device 1109 and the display 1110. Here, in a case where a function of the keyboard is realized, a software keyboard (referred to as so-called a software keyboard, a screen keyboard, or the like) may be drawn on a screen (touch screen) and the function of the keyboard may be realized without physical connection like the keyboard 1108.

A Hard Disk Drive (HDD) 1111 includes a built-in hard disk (which may be a flash Memory or the like), drives the hard disk, records or reproduces the program and the information which are executed by the CPU 1101. The hard disk stores the image received by the image reception module 110, the image extracted by the multi-crop processing module 140, the margin measurement table 900, and the like. Furthermore, the hard disk stores the other various data, various computer programs, and the like.

A drive 1112 reads the data or the program recorded in a removable recording medium 1113, such as a mounted magnetic disk, an optical disk, a magneto-optic disk, or a semiconductor memory, and supplies the data or the program to a RAM 1103 via an interface 1107, the external bus 1106, the bridge 1105, and the host bus 1104. Meanwhile, it is possible to use the removable recording medium 1113 as a data record area.

The connection port 1114 is a port which connects an external connection apparatus 1115, and includes a connection unit such as a USB or IEEE1394. The connection port 1114 is connected to the CPU 1101 or the like via the interface 1107, the external bus 1106, the bridge 1105, the host bus 1104, and the like. A communication unit 1116 is connected to the communication line, and performs a data communication process with the outside. The data reading unit 1117 is, for example, a scanner, and performs a document reading process. The data output unit 1118 is, for example, a printer, and performs a document data output process.

Meanwhile, a hardware configuration of the image processing apparatus illustrated in FIG. 11 shows one configuration example. The exemplary embodiment is not limited to the configuration illustrated in FIG. 11, and a configuration in which it is possible to execute the modules described in the exemplary embodiment may be used. For example, some modules may be formed by dedicated hardware (for example, Application Specific Integrated Circuit (ASIC) or the like), some modules may exist in an external system and may be connected via a communication line, and, furthermore, the plural systems illustrated in FIG. 11 may be connected to each other via the communication line so as to cooperatively operate with each other. In addition, the modules may be incorporated with, specifically, a mobile information communication apparatus (which includes a mobile phone, a smart phone, a mobile apparatus, a wearable computer, or the like), a home information electric appliance, a robot, a copying machine, a facsimile, a scanner, a printer, a multifunction printer, or like, in addition to the personal computer.

Meanwhile, in the above-described exemplary embodiment, a display apparatus, which displays the image files extracted by the multi-crop processing module 140, may be further included.

Furthermore, an instruction apparatus, which selectively instructs to continue a process (to use the extracted image) or to stop the process (to destroy the extracted image) with regard to the image files displayed on the display apparatus according to an operation of the user, may be further included. Furthermore, the image files output by the output module 150 may be selected according to the instruction.

Meanwhile, the described program may be supplied while being stored in the recording medium, and, in addition, the program may be supplied by a communication section. In this case, for example, the above-described program may be understood as the invention of a "computer-readable recording medium recording the program".

The "computer-readable recording medium recording the program" indicates a computer-readable recording medium recording the program, which is used to install, execute, and distribute the program.

Meanwhile, the recording medium includes, for example, "a DVD-R, a DVD-RW, a DVD-RAM, or the like" which is a Digital Versatile Disk (DVD) and is a standard formulated in a DVD forum, "a DVD+R, a DVD+RW, or the like" which is a standard formulated in the DVD+RW, a Compact Disk-Read Only Memory (CD-ROM), a CD-Recorder (CD-R), a CD-Rewritable (CD-RW), or the like, a Blu-ray (registered trademark) Disc, a Magneto-Optic disk (MO), a Flexible Disc (FD), a magnetic tape, a hard disk, a Read Only Memory (ROM), an Electrically Erasable and Programmable Read Only Memory (EEPROM (registered trademark)), a flash Memory, a Random Access Memory (RAM), a Secure Digital (SD) memory card, and the like.

Furthermore, the entirety or a part of the program may be preserved or distributed while being recorded in the recording medium. In addition, the program may be transmitted using a transmission medium which includes a wired network or a wireless communication network used for, for example, a Local Area Network (LAN), a Metropolitan Area Network (MAN), a Wide Area Network (WAN), the Internet, an Intranet, Extranet, or the like, and, furthermore, the combination thereof, or the like through communication. In addition, the program may be transferred while being placed on the carrier.

Furthermore, the program may be a part or the entirety of another program, or may be recorded in a recording medium together with a separate program. In addition, the program may be divided and recorded in plural recording media. In addition, in a case where restoration, such as compression or encoding, is possible, the program may be recorded in any aspect.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a processor configured to:
   receive a scanned image which is generated by scanning non-overlapping original documents which are placed on a scanning area and are covered by a dark sheet of object, the scanned image comprising a dark portion, an image portion duplicating the original documents, and a margin on the rim of the scanned image;
   perform painting on the margin so as to paint the margin dark; and
   extract a document from the image portion of the scanned image by performing a multi-crop process so as to duplicate an original document from the non-overlapping original documents,
   wherein the margin is located at an outer side of the scanned image and outside of the document.

2. The image processing apparatus according to claim 1, wherein the processor is configured to measure the margin, and
   perform the painting on the margin that has been measured.

3. The image processing apparatus according to claim 2, wherein the processor is configured to measure a width of the margin for each main scan or sub scan of the scanned image, and
   perform the painting on the width of the margin that has been measured.

4. The image processing apparatus according to claim 1, wherein the processor is configured to generate an image file for each of the non-overlapping original documents.

5. The image processing apparatus according to claim 4, wherein a background of the scanned image is black, and the background is obtained by photographing paper which is printed by an image forming apparatus, and
   wherein a color, which is obtained by performing the painting, is black.

6. A non-transitory computer readable medium storing an image processing program causing a computer to:
   receive a scanned image which is generated by scanning non-overlapping original documents which are placed on a scanning area and are covered by a dark sheet of object, the scanned image comprising a dark portion, an image portion duplicating the original documents, and a margin on the rim of the scanned image;
   perform painting on the margin so as to paint the margin dark; and
   extract a document from the image portion of the scanned image by performing a multi-crop process so as to duplicate an original document from the non-overlapping original documents,
   wherein the margin is located at an outer side of the scanned image and outside of the document.

7. An image processing method comprising:
   receiving a scanned image which is generated by scanning non-overlapping original documents which are placed on a scanning area and are covered by a dark sheet of object, the scanned image comprising a dark portion, an image portion duplicating the original documents, and a margin on the rim of the scanned image
   performing painting on the margin so as to paint the margin dark; and
   extracting a document from the image portion of the scanned image by performing a multi-crop process so as to duplicate an original document from the non-overlapping original documents,
   wherein the margin is located at an outer side of the scanned image and outside of the document.

* * * * *